(12) United States Patent
Deak et al.

(10) Patent No.: US 9,952,085 B2
(45) Date of Patent: Apr. 24, 2018

(54) MULTITURN PULLEY LIQUID LEVEL SENSOR DEVICE

(71) Applicant: MultiDimension Technology Co., Ltd., Zhangjiagang (CN)

(72) Inventors: James Geza Deak, Zhangjiagang (CN); Mark C. Tondra, Zhangjiagang (CN)

(73) Assignee: MultiDimension Technology Co., Ltd., Zhangjiagang (CN)

( * ) Notice: Subject to any disclaimer, the term of this patent is extended or adjusted under 35 U.S.C. 154(b) by 138 days.

(21) Appl. No.: 15/024,864

(22) PCT Filed: Sep. 26, 2014

(86) PCT No.: PCT/CN2014/087545
§ 371 (c)(1),
(2) Date: Mar. 25, 2016

(87) PCT Pub. No.: WO2015/043506
PCT Pub. Date: Apr. 2, 2015

(65) Prior Publication Data
US 2016/0231161 A1    Aug. 11, 2016

(30) Foreign Application Priority Data
Sep. 26, 2013    (CN) .......................... 2013 1 0369292

(51) Int. Cl.
*G01F 23/46* (2006.01)
*G01F 23/40* (2006.01)

(52) U.S. Cl.
CPC .............. *G01F 23/46* (2013.01); *G01F 23/40* (2013.01)

(58) Field of Classification Search
CPC .......... G01F 23/34; G01F 23/38; G01F 23/40; G01F 23/42; G01F 23/44; G01F 23/443;
(Continued)

(56) References Cited

U.S. PATENT DOCUMENTS 4,646,085 A * 2/1987 Mathis ................ G01F 23/0023
340/672
5,410,913 A  5/1995 Blackburn
(Continued)

FOREIGN PATENT DOCUMENTS

CN    2190290    2/1995
CN    2572359    9/2003
(Continued)

OTHER PUBLICATIONS

"International Application No. PCT/CN2014/087545, International Search Report and Written Opinion dated Dec. 17, 2014", (Dec. 17, 2014), 13 pgs.

*Primary Examiner* — Justin Olamit
(74) *Attorney, Agent, or Firm* — Schwegman Lundberg & Woessner, P.A.

(57) ABSTRACT

A multiturn pulley liquid level sensor device for measuring a liquid level in a well and in a container, comprising a mechanical float which is fastened to a fastening rope and which can slide up and down. The fastening rope is installed on one or more pulleys, and as the float moves up and down, the pulley rotates back and forth. One pulley is mechanically coupled to one digital absolute magnetic rotation encoder device, and the encoder device is used for monitoring the total rotation angle of the pulley in real time. By way of using an algorithm, the total rotation angle of the pulley is converted into a distance from the bottom to calculate the height of a liquid level. A multiwheel encoder has two reading types, i.e., one is an electrical signal reading type, and the other is an optical signal reading type. The electronic output of said encoder may be used as input to an industrial control system, or be sent via communications link to a remote or the internet. The precision of the level measurement is determined by the number of encoder wheels. A
(Continued)

mechanical gear or belt can adjust the total number of pulley turns corresponding to the full range of liquid level measurement.

12 Claims, 8 Drawing Sheets

(58) Field of Classification Search
CPC ........ G01F 23/446; G01F 23/46; G01F 23/54; G01F 23/543; G01F 23/546; G01F 23/62; G01F 23/686; G01F 23/72
See application file for complete search history.

(56) References Cited

U.S. PATENT DOCUMENTS

| | | | |
|---|---|---|---|
| 7,725,273 B2* | 5/2010 | Jannotta | G01F 23/46 |
| | | | 702/182 |
| 9,435,679 B2* | 9/2016 | Daily, III | G01F 23/443 |
| 2006/0117846 A1 | 6/2006 | Margolin et al. | |
| 2012/0060601 A1 | 3/2012 | Daily, III | |
| 2013/0269432 A1* | 10/2013 | Brutschin | G01F 23/44 |
| | | | 73/313 |

FOREIGN PATENT DOCUMENTS

| | | |
|---|---|---|
| CN | 2655201 | 11/2004 |
| CN | 101509755 | 8/2009 |
| CN | 203083583 U | 7/2013 |
| CN | 103424162 | 12/2013 |
| CN | 203629645 | 6/2014 |
| CN | 103968860 | 8/2014 |
| GB | 798790 | 7/1958 |
| WO | WO-2015/043506 | 4/2015 |

* cited by examiner

| Angle | Sensor number | Figure | Sensor output value | | | | |
|---|---|---|---|---|---|---|---|
| 0 | 1 | 0 | 0 | 1 | 0 | 1 | 0 |
| 36 | | 1 | 0 | 1 | 1 | 1 | 1 |
| 72 | 2 | 2 | 0 | 0 | 1 | 0 | 1 |
| 108 | | 3 | 1 | 0 | 1 | 1 | 1 |
| 144 | 3 | 4 | 1 | 0 | 0 | 1 | 0 |
| 180 | | 5 | 1 | 1 | 0 | 1 | 1 |
| 216 | 4 | 6 | 0 | 1 | 0 | 0 | 1 |
| 252 | | 7 | 1 | 1 | 1 | 0 | 1 |
| 288 | 5 | 8 | 1 | 0 | 1 | 0 | 0 |
| 324 | | 9 | 1 | 1 | 1 | 1 | 0 |

MULTITURN PULLEY LIQUID LEVEL SENSOR DEVICE

PRIORITY CLAIM TO RELATED APPLICATIONS

This application is a U.S. national stage application filed under 35 U.S.C. § 371 from International Application Serial No. PCT/CN2014/087545, which was filed 26 Sep. 2014, and published as WO2015/043506 on 2 Apr. 2015, and which claims priority to China Application No. 201310369292.1, filed 26 Sep. 2013, which applications and publication are incorporated by reference as if reproduced herein and made a part hereof in their entirety, and the benefit of priority of each of which is claimed herein.

TECHNICAL FIELD

The present invention relates to a sensor device that can measure a liquid level in a container or a well, and in particular, to a liquid level sensor that measures a liquid level by using a combination of a pulley, a fastening rope, an absolute magnetic rotation encoder and other devices.

BACKGROUND ART

In the technical field of liquid level sensors, two patent documents relevant to the present application which describe the prior art are listed herein. The first one is US Patent US2012/006060601 TETHERED FLOAT LIQUID LEVEL SENSOR, which describes a pulley-float device, in which, a float floats on a liquid level, a rotation sensor is used to record outputs, and a manner of transmitting data to a remote position is provided.

The second prior art document related to liquid level sensors is Blackburn's U.S. Pat. No. 5,410,913 'REMOTE INDICATING LIQUID LEVEL SENSOR', which shows a set of magnetic sensors for detecting movement of a magnet on the top of a rotation shaft. A key innovation point of the present application is using a magnetic sensor to detect movement and using an electronic circuit to collect and transmit data.

In the technical field of rotation encoders, the applicant has applied for a Chinese patent application with Application Number of CN 201310040970.X and entitled 'ABSOLUTE MAGNETIC ROTATION ENCODER', which describes a novel rotation encoder, and in comparison to the existing encoder, its advantage lies in using a magnetic sensor instead of an optical sensor; the optical sensor is easy to get dirty and is also easy to fail. The construction, principle and advantages of the absolute magnetic rotation encoder have been described in detail and clearly in the above application of the applicant.

The liquid level sensing systems in the prior art have some defects. They provide electronic output signals, but visual inspection cannot be carried out. The encoders are based on optics, and the optical encoders are prone to failure as a result of getting dirty. At present, there is no method that can be applied to make these devices widely applicable to measuring liquid levels in a well, and there is no method for improving the precision of this type of liquid level measurement.

SUMMARY OF THE INVENTION

An objective of the present invention is to provide a liquid level sensor device with a small volume, a low cost, high performance and high measurement precision, so as to overcome the above problems existing in the prior art.

To achieve the above technical objective and attain the above technical effect, the present invention is implemented through the following technical solution:

A multiturn pulley liquid level sensor device, for electronically and remotely monitoring a liquid level in a container or a well, the sensor device including:

a float which can float up and down with a change of the liquid level;

a fastening rope of which two ends are fastened onto the float;

at least one pulley, wherein the pulley is mechanically connected to the float through the fastening rope wound thereon, and the pulley rotates back and forth as the float moves up and down;

a magnetic encoder device mechanically coupled to the pulley, the magnetic encoder device including:

a rotation shaft, one or more rotating wheels that can rotate along with the rotation shaft;

a permanent magnet, a rotating wheel PCB and a magnetic sensor one-to-one corresponding to the one or more rotating wheels; and an external detection circuit electrically connected to the magnetic encoder device;

wherein the pulley achieves mechanical coupling with the magnetic encoder device through a mechanical connection between a wheel shaft thereof and the rotation shaft;

the magnetic encoder device outputs a corresponding digital signal according to a rotation angle of the pulley; and the external detection circuit calculates a current liquid level height according to the digital signal output by the encoder device.

Preferably, the pulley includes a top pulley and a bottom pulley. Preferably, a wheel shaft of the top pulley achieves a mechanical connection with the rotation shaft through a first connection device.

Preferably, the rotating wheels are connected to the bottom pulley.

Preferably, the sensor device further includes a housing device, the housing device further including a housing bottom plate and a housing top cap installed on the housing bottom plate.

Preferably, the housing top cap is made of a transparent material, or the housing top cap is provided thereon with a visual window.

Preferably, the top pulley and the magnetic encoder device are both located inside the housing device and are isolated from the outside through the housing device.

Preferably, the top pulley is located inside the housing device, the magnetic encoder device is located outside the housing device, and a sealed mechanical feed-through member is disposed between the housing top cap and a second connection device, for achieving signal intercommunication between the housing top cap and the second connection device.

Preferably, the sensor device further includes a system PCB, the system PCB extending out from the housing device, with the rotating wheel PCB installed thereon, and achieving an mechanical connection with the rotating wheels through the rotating wheel PCB.

Preferably, the diameter of the top pulley is greater than that of the rotating wheels, and a rotating shaft of the top pulley is collinear with a rotating shaft of the rotating wheels.

Preferably, a mechanical protective device is disposed nearby the fastening rope.

Preferably, the liquid level sensor device further includes a gear speed-increasing or speed-reducing device, for making the number of turns of rotation of the magnetic encoder device matched with the number of turns of actual rotation of the rotating wheels.

Preferably, the gear speed-increasing or speed-reducing device is a friction wheel coupling that can reduce friction, wherein the friction wheel coupling includes a hub and a wheel shaft, and a rotating shaft thereof is different from the rotating shafts of the top pulley and the rotating wheels.

Preferably, the external detection circuit has a wired and/or wireless data communication and interconnection function.

Preferably, a relation between the liquid level height and the total number of turns of rotation of a first rotating wheel of the one or more rotating wheels of the encoder is: $N=(L-L_{empty})/(\pi*RF)$, wherein N is the total number of turns of rotation of the rotating wheel, L is a measured liquid level height, $L_{empty}$ is a liquid level height in the case of an empty tank, D is an outer diameter of the top pulley, and RF is a reduction factor.

The PCB mentioned hereinabove and elsewhere herein is an abbreviation of printed circuit board, which is a common abbreviation by persons skilled in the art.

Compared with the prior art, the present invention has the following beneficial effects:

The present invention not only can reduce the volume and decrease the cost, but also can improve performance. In addition to electronic output, visual output is also provided, and the visual output is embodied in the form of numbered rotating wheels and LED display. Output precision is increased by one order of magnitude for each additional encoded rotating wheel, and in principle, there is no limitation to the number of useable encoded rotating wheels. A set of step-up or step-down gears are provided to calibrate actual depths that have been possibly measured, and such an absolute magnetic rotation encoding technology can avoid errors resulting from harsh environments.

The present invention uses less physical space, has a simpler control circuit, and provides users with more methods to obtain information related to the liquid level. The sensor is more reliable, the liquid level measurement precision is higher, the requirement for the power supply is lower, and a battery smaller than 5 V can be used to supply power.

BRIEF DESCRIPTION OF THE DRAWINGS

In order to illustrate the technical solutions in the technical embodiments of the present invention more clearly, the accompanying drawings that need to be used in the description of the technical embodiments will be introduced briefly in the following. Obviously, the drawings in the following description only present some of the possible embodiments of the present invention; for those of ordinary skill in the art, other drawings can also be obtained in accordance with the drawings without creative effort.

DETAILED DESCRIPTION OF THE PREFERRED EMBODIMENTS

The present invention is further described below with reference to the drawings and embodiments.

Figure 1:
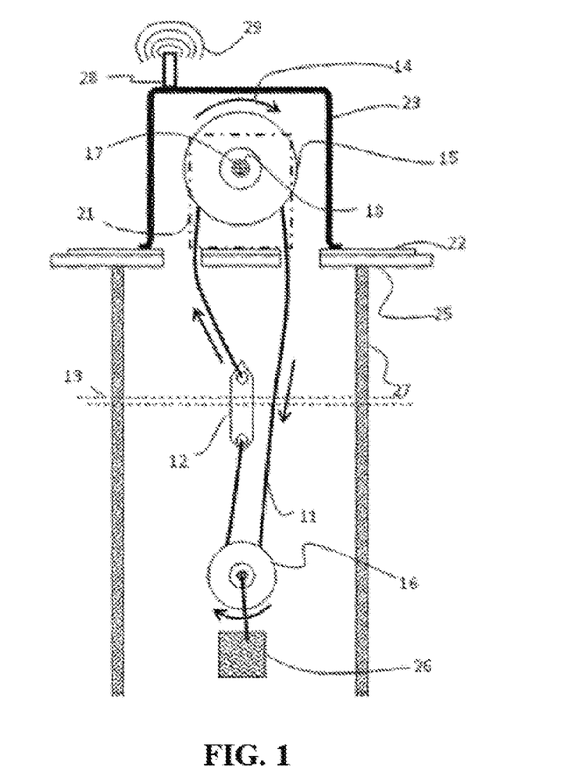
FIG. 1 is a sectional view of a pulley-float liquid level sensor in the US Patent US2012/0060601.

FIG. 1 is a sectional view of a pulley-float liquid level sensor in the prior art. The sensor has a fastening rope 11 thereon, two ends thereof are fastened onto a float 12, the height of a liquid level 13 is to be measured, and the float 12 must be able to float on the liquid level 13. The arrow shown in the figure indicates a movement direction of the fastening rope 11, which is also the movement direction of a top pulley 15 and a bottom pulley 16. The top pulley 15 rotates about a rotating shaft 17, a rotation direction thereof is 14, and the torque of the top pulley 15 is transmitted to a rotation encoder device (which is not shown in the figure) through a pulley shaft 18.

The pulley shaft 18 is supported by a bracket 21, and the bracket 21 is installed on a housing bottom plate 22. In an ideal situation, a housing cap 23 provides mechanical protection and isolation from external environments. A top pulley device is installed on a container wall 25, and in order to maintain ideal tension on the fastening rope 11, under the action of a weight 26, the bottom pulley 16 is pulled downwards. A protective tube 27 can be selected, to cause the fastening rope 11 and the float 12 to be maintained within an ideal range below the top pulley 15. The protective tube 27 must have some holes or another structure thereon to enable a liquid to flow through freely, and in this way, liquid levels 13 inside and outside the protective tube 27 are the same.

An antenna 28 sends a communication signal 29 to a remote system control unit (not shown in the figure), and so far, the discussion about the pulley liquid level sensor in the prior art has been ended.

The following three figures demonstrate the technological level of the current absolute magnetic rotation sensor technology, the three figures are all from the Chinese patent application with Application Number of CN 201310040970.X, and the application is incorporated herein by reference in its entirety.

For a typical rotating wheel, each rotating wheel can provide 10 outputs of different digits, and there may also be other counting bases. For example, rotating wheels of an encoder are numbered from 0 to 9, and in addition to electronic value output, it is also possible to provide a visual reading. A common configuration is that several rotating wheels (any number is possible, and more rotating wheels are required if the recording time is decades later) are installed together, and in this way, if a first rotating wheel rotates one turn, the second rotating wheel will rotate 0.1 turn (a general proportion is 1/(the number of different digits)). Similarly, except the final rotating wheel, if the $N^{th}$ rotating wheel rotates one turn, the $(N+1)^{th}$ rotating wheel will rotate 0.1 turn. Such a multiwheel assembly can record readings of decades.

The existing encoding technology further includes light transmission encoding, light reflection encoding and electrical contact encoding. A problem easily occurs in an optical method due to dirt and light pollution, and the cost is higher as a light source and a light detector need related electronic elements. As time goes on, an electrical contact encoder will age, and reliability thereof may also be reduced. Other encoding technologies in the prior art also have alternately magnetized magnetic targets and magnetic induction detectors. The magnetic targets are more expensive, and their own precision is limited to permanent magnetization capability of the material. A magnetic encoder disk which has a lower cost, is simpler and more accurate will be good for the flow meter and electric meter industry.

Referring to the views of a 5-rotating-wheel absolute rotation encoder as shown in FIGS. 2A-2D, the whole device provides a visual electronic manner to record the total number of turns of rotation of the rightmost rotating wheel 101. Visual recording starts from the top counting on each rotating wheel. Therefore, when the current reading is 00019 turn, this means that the rightmost rotating wheel 101 has rotated a full turn and is about to complete the second turn. It is named '$10^0$', because this represents an order of magnitude in base 10. The second to last rotating wheel 102 from the right is named '$10^1$', the third last rotating wheel 103 from the right is named '$10^2$', the fourth last rotating wheel 104 from the right is named '$10^3$', and the fifth last rotating wheel 105 from the right is named '$10^4$'.

A relationship of the number of turns of rotation between the rotating wheel 102 and the rotating wheel 101 is 10:1, and this means that the $10^1$ rotating wheel 102 rotates 1 turn each time the $10^0$ rotating wheel 101 rotates 10 turns. Similarly, each time the $10^1$ rotating wheel 102 rotates 10 turns, the $10^2$ rotating wheel 103 rotates 1 turn. Generally, each time the $10^N$ rotating wheel rotates 10 turns, an adjacent $10^{N+1}$ rotating wheel will rotate 1 turn, wherein N is a natural number. Although only a 5-rotating wheel encoder is shown in the figures, the principle thereof can be easily applied to an encoder with any number of rotating wheels.

Other components shown in FIG. 2 rotate about a rotating shaft 107. The components together make up a rotating device 121, as shown in FIG. 2D. A disk 110 is in a thin circular shape, which is made of a soft magnetic material, for example, a Ni—Fe permeability alloy, a high permeability alloy or ferrite. The disk 110 has a structural change 113 thereon, which may be a hole, a bump or another magnetic structure. The disk 110 shown in the figure only has one structural change, but for a certain particular application, there may be more structural changes.

Figure 2A:
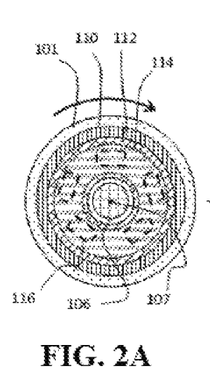
FIGS. 2A-2D are front views and sectional views of an absolute magnetic rotation encoder (5 rotating wheels and 5 sensor devices) in the prior art.
Figure 2B:
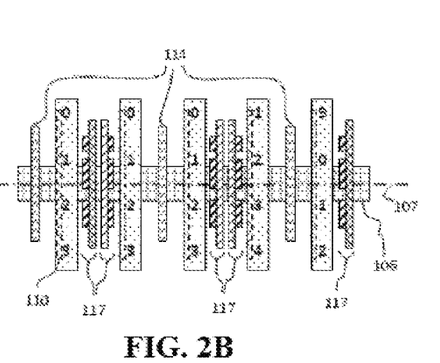
Figure 2C:
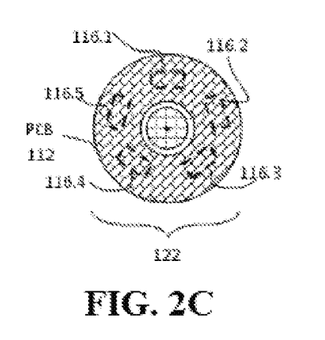
Figure 2D:
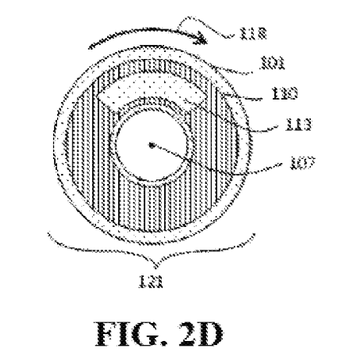

A stationary device 122 has a permanent magnet 114 and 5 sensors 116.1, 116.2, 116.3, 116.4 and 116.5, and the 5 sensors are collectively referred to as a sensor 116. The sensors are installed on a printed circuit board (PCB) 112, the PCB 112 provides an electrical connection for the sensor 116, and it also provides mechanical support for the stationary device 122 that includes the permanent magnet 114. The stationary device and the rotating device have lots of possible structural changes thereon which can be used, and this embodiment is merely a typical embodiment. The permanent magnet 114 provides a magnetic field that can magnetize the disk 110. Typically, the magnetic field of the permanent magnet 114 is designed to be along an axial direction of the rotating shaft 107, and the direction of the magnetic field is perpendicular to a plane including the PCB 112 and the sensor 116. The reason for such a design is that the structural change 113 on the permeable disk 110 can change the magnetic field direction in a nearby region thereof. As the structural change 113 rotates beyond a certain sensor in the sensor 116, the sensor can measure a changed magnetic field. Such a multi-sensor device, by decoding the magnetic field value displayed below, can determine the angle of the rotating structural change 113.

Now such a magnetic design is discussed in more detail. As shown in FIG. 3C, the permeable disk 110 represented with black and white in the figure can be seen. In the present application, a cylindrical coordinate system is used, the radial direction thereof is from the center to the outside (within a page), represented with a variable R, the angular direction thereof is represented with a variable θ, which is also within the page, and the Z-axis direction is perpendicular to the page.

The sensors 116.1-116.5 are arranged in such a way that their axial sensitivity can be parallel to the radial direction R at specific angles of their locations. They have no sensitivity in the Z-axis direction and the θ direction. FIG. 3C displays the angle of the location of each sensor and their sensitivity directions, represented with [sensor, sensitivity angle (degree)], [116.1, 0], [116.2, 72], [116.3, 144], [116.4, 216] and [116.5, 288]. The radius of their locations may also be a little greater than 190 $R_{Track}$. According to the magnetic model in the prior art, it can be known that the magnetic field outside the $R_{Track}$ bends outwards at the left half θ=0° which is greater than the radius R, but does not bend at all at the right half θ=180°. The magnetic field's bending in the positive direction of the radial direction means that there is a small part of the magnetic field at θ=0°, which is parallel to the positive direction of the radial direction. A magnetic simulation result of a radial component $B_{Radial}$ at the sensor position is a curve 191 drawn in the following FIG. 4. The sensor 116.1 is designed to have sensitivity for the component $B_{Radial}$ but have no sensitivity for the component $B_z$. If one sensor at θ=180° in the lower right corner of the figure is at a place greater than radial $R_{Track}$, no magnetic field can be measured at all, this is because $B_{Radial}$=0 at θ=180°. In brief, as the disk 110 rotates relative to the fixed sensors 116.1-116.5, the amplitude of the magnetic field measured by a certain particular sensor near the structural change 113 is very small but greater than zero, and when the sensor is farther from the structural change 113, the amplitude value approximates more to zero.

Therefore, when the permeable disk rotates relative to the sensor, the magnetic sensor can detect whether or not there is a structural change on the permeability disk. Such an effect is used to design a magnetic encoder. Each sensor disposed according to a particular angle position can provide an electrical signal, and if the position of the disk is different, the corresponding electrical signal is also different. An electronic circuit can convert an analog signal of the magnetic sensor to a digital signal, for example, 1 represents that there is a structural change and 0 represents that there is no structural change. Moreover, if one set of structural changes are made, for example, structural changes 113.1 and 113.2, when the encoder rotating wheel 101 and the disk 110 rotate together relative to the fixed sensors, in 10 positions of the encoder rotating wheel 101, a series of signals obtained from the sensors 116.1-116.5 for each position are different.

Figure 3A:
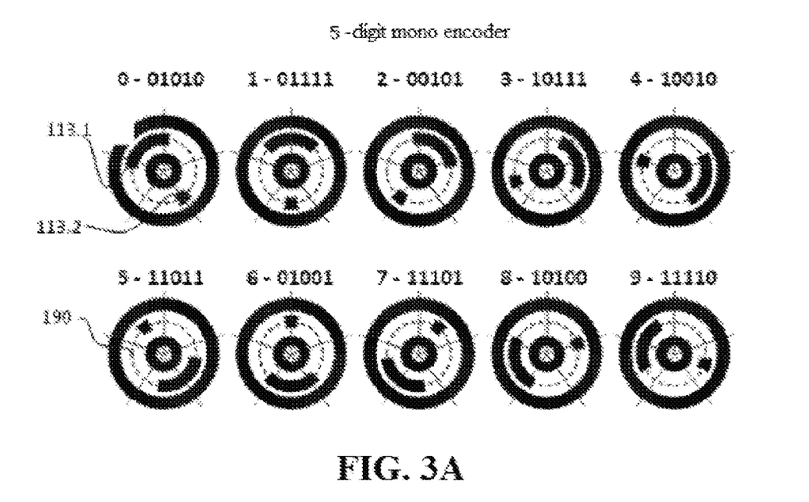
FIGS. 3A-3C are one embodiment of the absolute magnetic rotation encoder in the prior art, a schematic view of a 5-wheel digital encoder and a table of sensor code output.
Figure 3B:
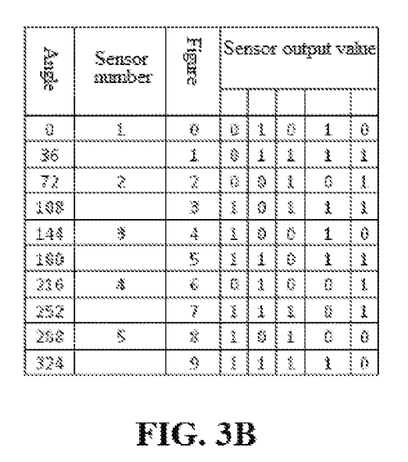
Figure 3C:
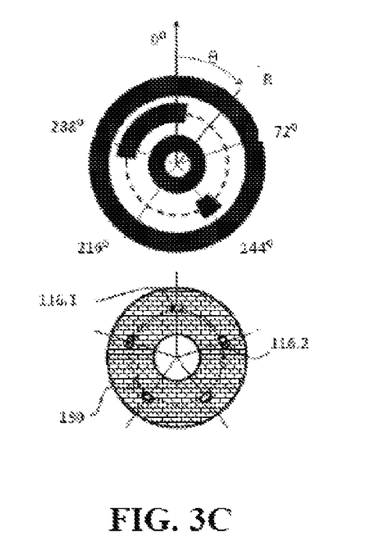

An overview of such an encoding scheme is as shown in FIG. 3. FIG. 3A shows 10 different angle positions of the disk 110 relative to the sensors 116.1-116.5. In the table of FIG. 3B, the figures in the column "figure" correspond to the number of each position in the 10 positions displayed on the rotating wheel. The column "angle" displays the value of a rotation angle θ from θ=0°. The column "Sensor number" displays the number of the sensor existing on a fixed circuit board at a given angle position. The column "output values of sensors" displays signal output of each sensor in the 5 sensors. The 5 values are combined together to form a combination of code values '1' and '0' at each angle. The codes of the 5 figures are signs on each ring in FIG. 3A. For example, the FIG. 4 (the upper row, the right side) starts to rotate clockwise from θ=0°: the sensors 116.1 and 116.4 do not correspond to structural changes, and the sensors 116.2, 116.3 and 116.5 correspond to structural changes. When the value of the rotation angle is θ=144°, this situation will arise, and the output code is 10010.

Figure 4A:
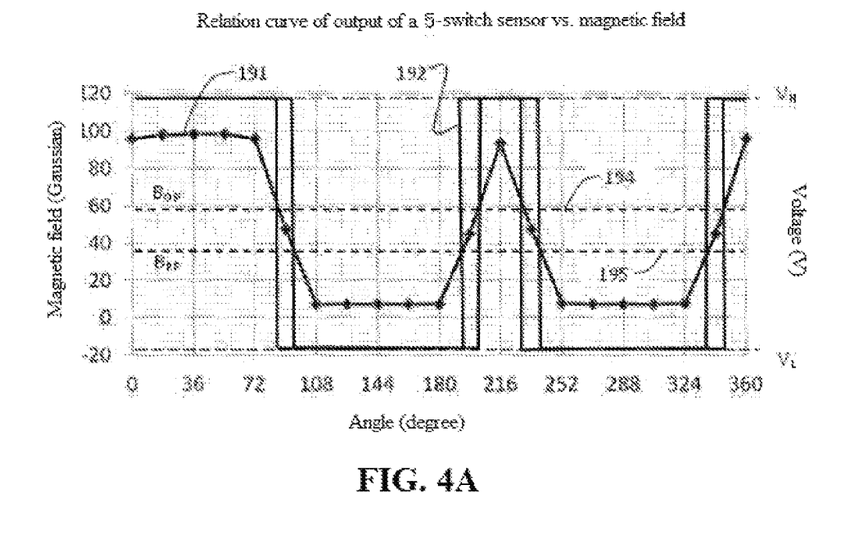
FIGS. 4A-4B are a relation curve of output of a sensor vs. angle position and magnetic field as well as a relation curve of voltage vs. externally applied magnetic field in the absolute magnetic rotation encoder of the prior art.

FIG. 4 illustrates a relation curve between output of a 5-switch sensor and a magnetic field. When the rotation angle of the disk is a full turn from θ=0° to θ=360°, the magnetic fields measured by the sensor 116.1 at θ=0° and expected to exist are as shown in FIG. 4A. In the figure, below the axis is the rotation angle of the disk 110, and the left axis is a magnetic induction intensity component $B_{Radial}$ obtained from the magnetic field model. A magnetic field (Gauss)-angle (degree) relation curve is a heavy solid line marked with diamond signs in the figure, that is, the curve 191. The right axis is a sensor output voltage of a magnetic switch sensor, and the sensor has been described in the prior art. A sensor output voltage (V)-angle (degree) relation curve is represented with a thin curve 192 in the figure.

Figure 4B:
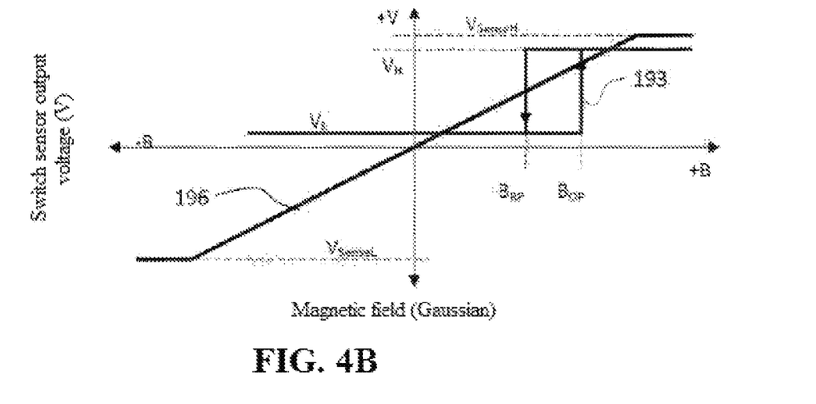

FIG. 4B includes a typical response of a commercial digital magnetic switch to an applied magnetic field. The switch converts an analog signal (that is, the curve 196 in the figure) of the magnetic field to a digital (2-state) electronic signal for output. The horizontal axis is a magnetic field (Gauss), and the vertical axis is a switch sensor output voltage (V). A relation curve between an output voltage of a digital magnetic switch and an applied magnetic field is the curve 193 in the figure. It should be noted that magnetic hysteresis exists on the curve. When applied magnetic induction intensity is a negative value, the output voltage is a low value $V_L$. With increase of the magnetic induction intensity, the value becomes positive and is increased to go beyond a defined magnetic field operating point $B_{OP}$, and the sensor output value will be converted from the low value to a high value $V_H$. Then, as the magnetic induction intensity gradually decreases from a great positive value, the output value is converted back to the low value $V_L$ at the magnetic field reset point $B_{RP}$. Two conversion thresholds $B_{OP}$ and $B_{RP}$ of the magnetic field are shown by the dotted lines 194 and 195 in the upper half of the figure. Therefore, when an external magnetic field curve 191 of the sensor penetrates through the dotted lines $B_{OP}$ and $B_{RP}$, the sensor output is as shown by the curve 193 in the figure.

An analog output of a magnetic sensor element is as shown by the curve 196. When the applied magnetic field is close to zero, responses between output voltages and the applied magnetic field are in a linear relationship. The curve is substantially antisymmetric relative to the point B=0. At forward and reverse magnetic induction intensity B of the great value, the sensor respectively outputs saturation values $V_{senseH}$ and $V_{senseL}$. The desired sensor responses can be obtained by carefully designing and constructing a magnetic sensor.

The above describes the background technology of the absolute magnetic rotation encoder. The innovation of the present application lies in a combination with the following two prior art fields: 1) a pulley liquid level sensor, and 2) an absolute magnetic rotation encoder. The following describes the technology of the present application in detail, and provides several different embodiments.

Embodiment 1 an encoder has 5 rotating wheels, each rotating wheel has 5 sensors, a pulley is provided on the top, within a sealed housing, sealed electricity is fed through to an external electronic communication unit, and a weight is provided on a bottom pulley.

Figure 5:
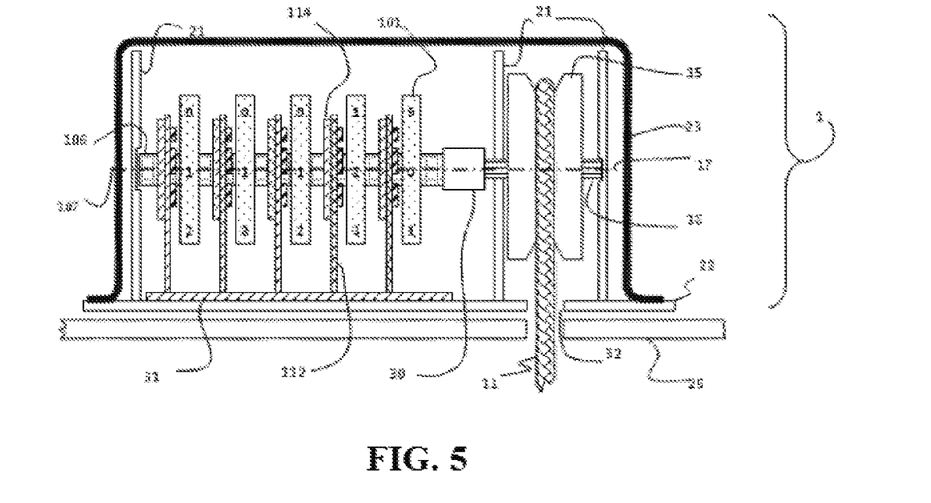
FIG. 5 is a front view of a portion of a multiturn pulley liquid level sensor according to the present invention.
Figure 6:
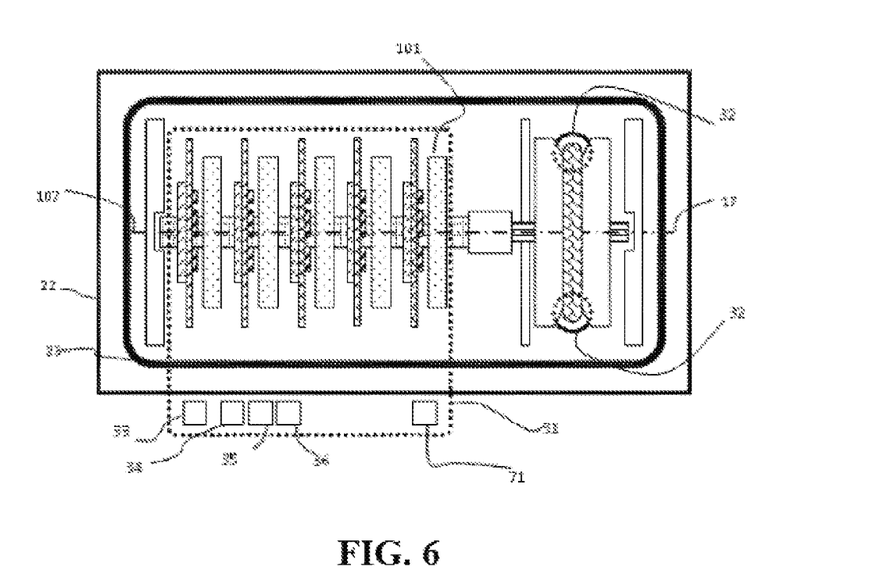
FIG. 6 is a top view of some components at the top of the multiturn pulley liquid level sensor according to the present invention.
Figure 7:
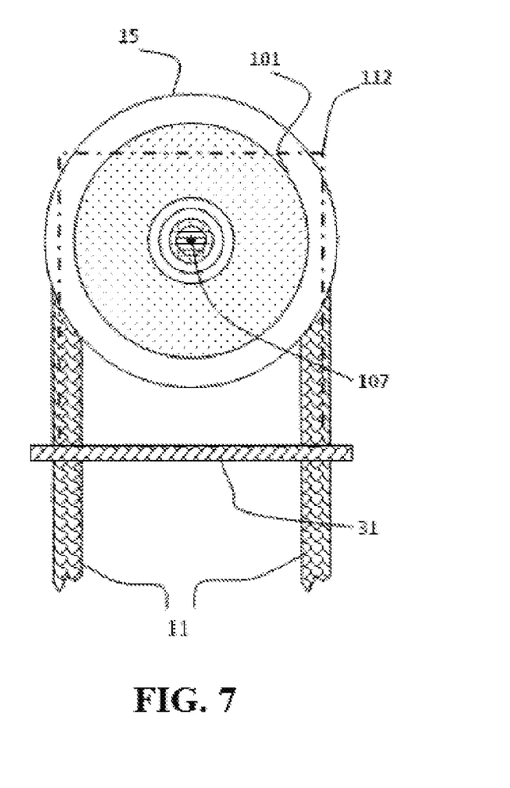
FIG. 7 is a view of end faces of some components and a pulley in the encoder device of the multiturn pulley liquid level sensor according to the present invention.

The first embodiment of the present application is as shown in FIGS. 5, 6 and 7. FIG. 5 is a front sectional view. A coupler 30 provides a mechanical connection between a pulley shaft 18 and an encoder rotation shaft 106. A bracket 21 supports the weight of the pulley shaft 18 and the encoder rotation shaft 106 and an additional acting force, and the bracket 21 is installed to the top of a housing bottom plate 22. 5 sets of rotating wheel PCBs 112 are installed onto a system PCB 31, the rotating wheel PCBs 112 provide electrical connections between the sensor 116 and the system PCB 31, and they can also provide some mechanical supports for other parts of the encoder device, for example, the permanent magnet 114.

The housing bottom plate 22 serves as a mechanical chasis of the entire encoder top device 1 in the liquid level encoder. The container wall 25 is the topmost structure of the container or the well, and by using an ordinary method, for example, a screw, an adhesive or an adhesive tape, the housing bottom plate 22 can be fixed onto the container wall 25. In the figure, the two components are separately displayed with a small gap, which aims to display the boundary between the encoder top device 1 and a top mechanical part on the measured liquid level device. In actual use, there is no gap between the encoder top device 1 and the container wall 25.

The encoder top device 1 includes all components located above the container or the wellhead. Referring to FIG. 1, it can be seen that components suspended in the well are only the fastening rope 11, the float 12, the bottom pulley 16 and the weight 26. The encoder top device 1 includes a housing top cap 23, which is installed on the housing bottom plate 22, the housing top cap 23 is used for protecting other components in the encoder top device 1, and it is also possible to provide environmental sealing between internal and external environments of the well or the container.

There are one or two fastening rope holes 32 on the housing bottom plate 22 and the container wall 25. When the float 12 floats on the liquid level 13, with the change of the liquid level, the fastening rope 11 can move up and down freely through the fastening rope holes 32. In the example of the prior art shown in FIG. 1, the friction force between the fastening rope 11 and the top pulley 15 produces a torque, and the torque is transferred to the encoder rotation shaft 106 through the pulley shaft 18 and the coupler 30. In turn, according to the design scale of the encoder rotating wheel shown and described in FIG. 2, the torque causes the encoder rotating wheel to rotate.

FIG. 6 is a top view of the selected component in the top device 1. The system PCB 31 extends out from an outer housing formed by the housing bottom plate 22 and the housing top cap 23, and some sealants or washers can be used to seal gaps around an opening from which the system PCB 31 extends out. Such a design provides a simple electrical connection and a data interface, and without removing the PCB from the sealed position, the battery can be replaced if necessary.

A lower edge of the system PCB 31 shows some electrical and data characteristics. A power supply connection 71 provides a power supply and a ground loop, and an electrical interconnection device 33 is a set of wired socket terminals. The terminals can be used for sending and receiving standard electrical analog control signals, for example, voltage, 4-20 mA current and pulse width modulation (PWM). An Internet-network interface 34 provides an interface for a standard common network, for example, an Ethernet, a USB, or a firewire. A radio input/output 36 (which uses an antenna 28 and a signal 29, see FIG. 1) provides a wireless interface for Wi-Fi, Bluetooth and Zigbee. A visual output 35 provides a display readable through naked eyes, for example, a light display and/or an LED display. Such a display can display such basic system performance as 'On/Off/Error' and more specific information, for example, a current liquid level.

FIG. 7 is a view of end faces of selected components in the pulley and the encoder device. The diameter of the top pulley 15 should be greater than that of the encoder rotating wheel 101, which is the same as that in FIG. 5. It should be noted that, in the first embodiment including the illustrations in FIG. 5 and FIG. 6, the rotating shaft 17 of the pulley and the rotating shaft 107 of the encoder are on the same straight line, and other options of the shafts will be discussed later.

Embodiment 2 other contents are the same as those in Embodiment 1 except that a protective tube is added.

Although not shown in FIG. 5, FIG. 6 and FIG. 7, a structure may be added nearby a fastening rope device below the container wall 25, for example, the protective tube 27 shown in FIG. 1. The purpose of adding such a structure is to maintain the float and other device components in proper positions of the well or the container and, at the same time, far away from any object that damages movement.

Embodiment 3 other contents are the same as those in Embodiment 1 except that the sealed housing has a transparent cover from which the digits on the rotating wheels can be read directly.

The housing top cap 23 can be made of such a transparent material as plastic, and values on the encoder rotating wheels 101-105 can be read directly without removal of the top cap. In addition, if the housing top cap 23 is not transparent, it is also feasible to dispose a small transparent window thereon.

Embodiment 4 it is basically the same as Embodiment 1, and the difference mainly lies in that there is no visual reader.

Embodiment 5 it is basically the same as Embodiment 1, and the difference mainly lies in that a gear speed-increasing or speed-reducing device is added to match the number of turns of rotation of the encoder with the number of turns of actual rotation of the rotating wheels.

The concepts and devices described in the previous four embodiments are all applicable to wells or containers with an extreme depth range. As each rotating wheel of the encoder represents a different order of magnitude, if one or more encoder rotating wheels are added in addition to the 5-rotating wheel device described above, one or more factors of a multiple of 10 rotations can be provided. In addition, an additional encoder rotating wheel can be used for increasing precision of depth measurement. Owing to a variety of reasons, it is necessary to change a ratio of the number of turns of rotation of encoder counting rotating wheels to the total moving distance of the float, and one possible modification manner that can achieve such a function is shown in the following two figures.

Figure 8:
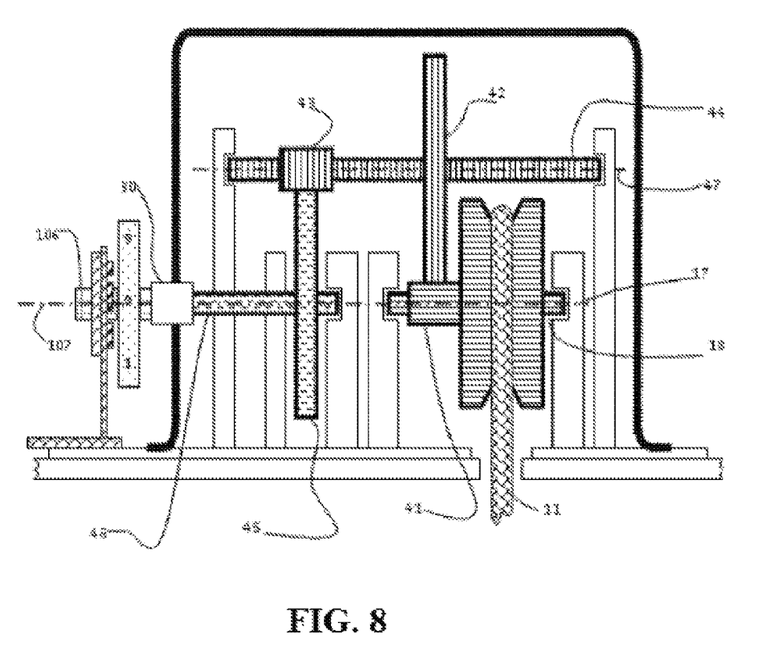
FIG. 8 is a sectional view of a mechanical friction wheel coupling device.
Figure 9:
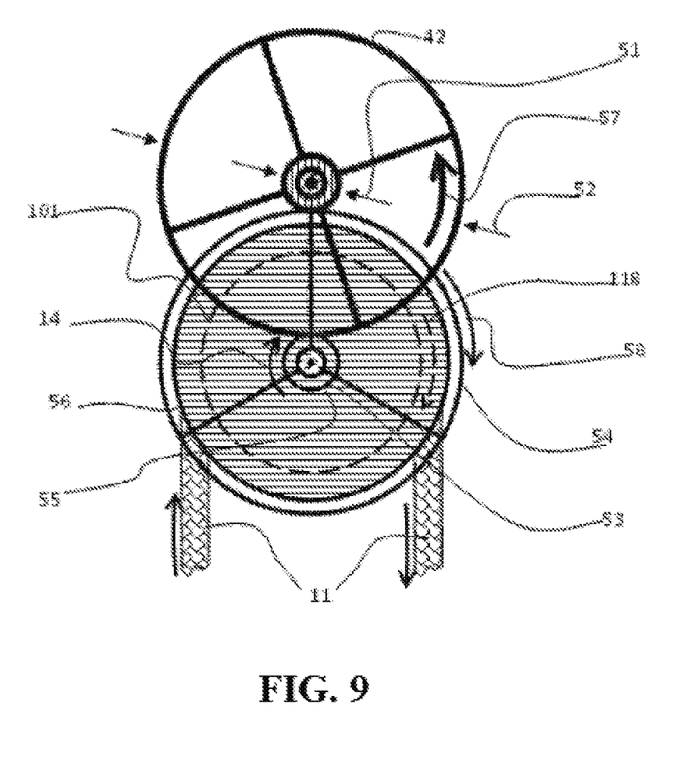
FIG. 9 is a side view of the friction wheel coupling in FIG. 8.

FIG. 8 shows a rotating wheel device that can reduce friction, and FIG. 9 is a sectional view thereof. Some additional rotating wheels are mechanically disposed between the pulley shaft 18 and the encoder rotation shaft 106, and the rotating wheels can change a ratio of the number of rotations of the pulley to the number of rotations of the encoder rotating wheels. A center hub 41 is further disposed on the pulley shaft 18; in addition, a smaller first friction wheel coupling 42 is further disposed, of which the hub is 43 and the wheel shaft is 44. The rotating shaft of the first friction wheel coupling device is different from the previous one, its rotating shaft is a rotating shaft 47, and the rotating shaft plays a supporting role.

Similarly to previously described, a second friction wheel coupling 45 and its wheel shaft 46 are mechanically connected to the encoder rotation shaft 106 by using the coupler 30. The friction force at a key point on the device can drive the second friction wheel coupling 45 to rotate. The friction force between the center hub 41 and the first friction wheel coupling 42 produces a torque at the pulley 18 and the first friction wheel 42, and the friction force between the hub 43 of the first friction wheel coupling and an outer surface of the second friction wheel coupling 45 produces a torque at the second friction wheel coupling 45.

A 'friction wheel device' herein is used to describe a mechanical device, and rotational movement of the mechanical device can be transferred from one rotating wheel to another friction wheel. Although this is not a unique method applicable to an absolute liquid level instrument, such a method has appeared in the prior art. There are other feasible methods, including: a mechanical gear, a magnetic coupling plate and a universal joint. An ideal result is that the number of rotations of the float 12 connected to the fastening rope 11 occurring at a given position can be modified.

FIG. 9 is a sectional view of the friction wheel device in FIG. 8, and the figure emphasizes the inner diameter of the hub and the outer diameter of the rotating wheel. The outer diameter of the first friction wheel 42 is D2 52, and the diameter of the hub thereof is D1 51; the outer diameter of the second friction wheel 45 is D4 54, and the diameter of the hub thereof is D3 53. The outer diameter of the top pulley 15 is D5 55, and the diameter of the center hub 41 is D6 56.

A change of the rotation speed is calculated by confirming a relationship between linear rates at which a rigid rotating wheel moves inside and outside. In addition, suppose that there is no sliding, it can be obtained according to the following equation (1) that, when the $N^{th}$ rotating wheel rotates, a moving distance S of one point at the diameter D is $$S = \pi * D * N. \tag{1}$$

If two points are located on the same rotating wheel but at different diameters, that is, they are respectively at D1 and D2, respective moving distances of the two points can be obtained by solving the equation (1), then their solutions are divided, and their relative moving distance can be obtained, as shown by equations (2)-(5).

$$S_1 = \pi * D_1 * N \tag{2}$$

$$S_2 = \pi * D_2 * N \tag{3}$$

$$S_1 : S_2 = D_1 : D_2 \tag{4}$$

$$S_1 = S_2 * D_1 / D_2. \tag{5}$$

Suppose that there is no motion, the center hub 41 of the pulley comes in contact with the first friction wheel coupling 42, and the hub 43 of the first friction wheel coupling comes in contact with the second friction wheel coupling 45. This means that moving distances of inner and outer surfaces are the same on the contact points. However, according to the above equations (4)-(5), moving distances of the hubs on a given friction wheel can be obtained, but their sizes are different.

Under the action of the fastening rope 11, the relationship between moving distances of the pulley 15 on two sides of its rotating shaft is $$S5 = S6 * D5/D6 \tag{6}$$

Wherein D5 is the diameter 55 of the center hub of the pulley, and D6 is the outer diameter 56 of the pulley.

The relationship between moving distances of the first friction wheel 42 on two sides of its rotating shaft is $$S1 = S2 * D1/D2 \tag{5}$$

Wherein, D1 is the diameter 51 of the hub of the first friction wheel 42, and D2 is the outer diameter 52 of the first friction wheel 42.

The relationship between moving distances of the second friction wheel 45 on two sides of its rotating shaft is $$S3 = S4 * D3/D4 \tag{7}$$

Wherein, D3 is the diameter 53 of the hub of the second friction wheel 45, and D4 is the outer diameter 54 of the second friction wheel 45.

In short, a series of net movement reduction factors can be obtained by multiplying the factors, that is $$RF = D5/D6) * (D1/D2) * (D3/D4) \tag{8}$$

The reduction factor involves two situations: as shown in FIG. 8, the fastening rope 11 is wound about the wheel shaft 46 of the second friction wheel.

Now, the total change quantity of the liquid level of the float 12 is calculated according to the number of turns of rotation of the encoder rotating wheels 101-105. At first, the number of turns of rotation corresponding to one change of the liquid level in the case of no speed reduction is calculated; then the number of turns of rotation is divided by the reduction factor, L is used to represent the measured liquid level, and it is assumed that the value range of L is $L_{empty} \sim L_{full}$.

If the fastening rope 11 is wound about the wheel shaft 46 of the second friction wheel, each time the encoder rotating wheel 101 rotates one turn, the change quantity of L is ΔL, and the equation (1) can be converted to $$\Delta L/N = \pi * D3 \tag{9}$$

The above equation indicates the case of no speed reduction; now a reduction factor is added to the equation (9), and the equation changes into $$\Delta L/N = \pi * D3 * (D6/D5) * (D2/D1) * (D4D3) = \pi * D4 * (D6/D5) * (D2/D1) \tag{10}$$

By using the equation (10), for the float 12 at a given liquid level above $L_{empty}$, the number of rotations of the encoder rotating wheel is $$N = (L - L_{empty}) / [\pi * D4 * (D6/D5) * (D2/D1)] \tag{11}.$$

The equation (11) is a general relational expression, and the expression applies to solving a reduction ratio of a set of particular rotating wheels.

By using the equation (11), it is also feasible to design a reduction ratio desired for a given well depth and a given number of rotations of a rotating wheel. For example, suppose that the encoder has 5 rotating wheels, the encoder can provide a number of different rotation values up to 100,000 (for example, from 0 to 99,999). If the well depth is 100 m, according to the equation (11), the following reduction factor can be obtained $$RF = \pi * D4 * (D6/D5) * (D1/D1) = (L - L_{empty})/N = 100/100000 = 1 \times 10^3 \text{ meter per rotation} \tag{12}$$

Therefore, in the case that the desired number of rotations of the encoder rotating wheels and the well depth that can meet the number of rotations are known, the equation (12) gives a feasible method of achieving a designed reduction ratio.

Embodiment 6 the pulley is not in the sealed housing, and a sealed mechanical feed-through member is disposed.

In this embodiment, an absolute magnetoresistive encoder may be located outside the sealed volume. A feed-through member making rotational movement may be used as a coupler 30, and is sealed between the housing top cap 23 and the coupler 30; as shown by the sectional part of FIG. 8, this is contrary to the embodiment shown in FIG. 5 and FIG. 6, and in the embodiment shown in FIG. 5 and FIG. 6, the housing top cap 23 completely encloses the encoder rotating wheel assembly 101-105.

Embodiment 7 the encoder rotating wheel is connected to the bottom pulley.

In another embodiment, the encoder rotating wheel is connected to the bottom pulley, instead of being connected on the top of the well or the container. Herein, the bottom and the top are defined according to the direction of gravity, but such a situation is not shown in the figure. In this embodiment, the encoder installed in the bottom is connected to a top signal sending unit by using an electronic fastening rope or a radio connection.

Embodiment 8 it is basically the same as Embodiment 1, and the difference lies in that the rotating shafts are not collinear.

Referring to FIG. 5, preferably, a composite device is designed as a situation wherein the rotating shaft 15 of the pulley is not collinear with the rotating shaft 107 of the encoder, but such a concept is not explicitly given here. Such a concept can be easily achieved on a device including a universal joint and some friction wheels or gears.

Figure 10:
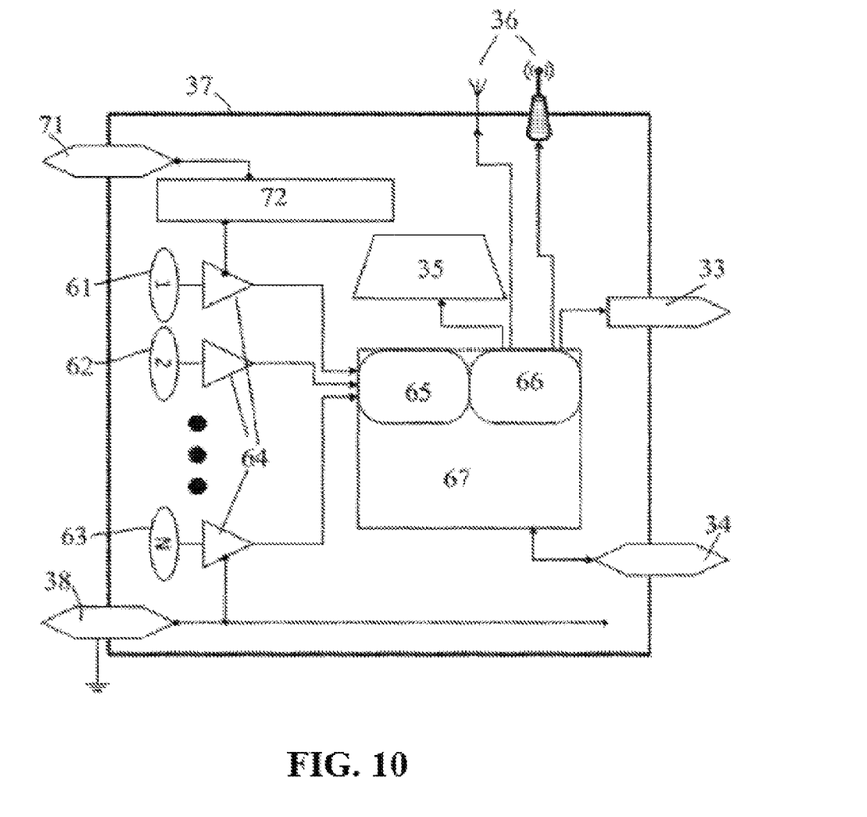
FIG. 10 is a schematic view of an external detection circuit.

FIG. 10 is a schematic circuit diagram of a system circuit 37; the system circuit is an external detection circuit, which has a wired and/or wireless data communication and interconnection function. It is the system PCB 31 that is interconnected to the original circuit and provides support for the original circuit, the circuit obtains a power supply from a power supply input end 71, and a ground end thereof is 38. An internal voltage stabilizer 72 provides a steady voltage for an internal circuit. Suppose that the total number of the encoder rotating wheels is N, now analog signal input ends of the encoder rotating wheels are marked as a first rotating wheel encoder 61, a second rotating wheel encoder 62, until the $N^{th}$ rotating wheel encoder 63. Analog voltage signals (as shown by the curve 191 in FIG. 4) on each encoder rotating wheel may be transported to an analog amplifier and a comparator 64. Each encoder channel has a comparator, and thus there are a total of N comparators 64. The comparators 64 output high-value or low-value digital signals (as shown by the curve 192 in FIG. 4), and transport the digital signals to a signal processor 65. A microcontroller 67 obtains an output result through an algorithm, which is output through a digital output stage 66. An output result may be a digital first output form at an electrical interconnection device 33, may also be an optical or visual output form at a visual display 35, and may further be a digital data form for a variety of standard modes (for example, Ethernet 34, WiFi 36).

The above descriptions are merely preferred embodiments of the present invention, and are not intended to limit the present invention. For persons skilled in the art, the present invention may have various modifications and changes. Any modification, equivalent replacement, improvement and the like made within the spirit and principle of the present invention shall be included in the protection scope of the present invention.

The invention claimed is:

1. A multiturn pulley liquid level sensor device for electronically and remotely monitoring a liquid level in a container or a well, the sensor device comprising:
   a float which can float up and down with a change of the liquid level;
   a fastening rope of which two ends are connected onto the float;
   at least one pulley, wherein the pulley is connected to the float through the fastening rope, and the pulley rotates as the float moves up and down; and
   a magnetic encoder device mechanically coupled to the pulley, the magnetic encoder device comprising:
      a rotation shaft;
      a rotating wheel rotating along with the rotation shaft;
      a permanent magnet;
      a rotating wheel PCB;
      a magnetic sensor; and
   an external detection circuit electrically connected to the magnetic encoder device;
   wherein the pulley achieves mechanical coupling with the magnetic encoder device through a mechanical connection between a wheel shaft and the rotation shaft, the magnetic encoder device outputs a corresponding digital signal according to a rotation angle of the pulley, and the external detection circuit calculates a current liquid level height according to the digital signal output by the encoder device,
   wherein the at least one pulley and the magnetic encoder device are located inside a housing device,
   wherein the sensor device further comprises a system PCB that extends out from said housing device, said rotating wheel PCB is mounted on the system PCB, and the system PCB is mechanically connected to said rotating wheel through said rotating wheel PCB.

2. The multiturn pulley liquid level sensor device according to claim 1, wherein the pulley comprises a top pulley and a bottom pulley.

3. The multiturn pulley liquid level sensor device according to claim 2, wherein a wheel shaft of the top pulley is mechanically connected with the rotation shaft through a first connection device.

4. The multiturn pulley liquid level sensor device according to claim 2, wherein the rotating wheels are connected to the bottom pulley.

5. The multiturn pulley liquid level sensor device according to claim 1, wherein the housing device further comprising a housing bottom plate and a housing top cap installed on the housing bottom plate.

6. The multiturn pulley liquid level sensor device according to claim 5, wherein the housing top cap is made of a transparent material, or the housing top cap is provided with a visual window.

7. The multiturn pulley liquid level sensor device of claim 1, where a diameter of said pulley is greater than a diameter of said wheel, and a pulley rotation axis and a wheel rotation axis are collinear.

8. The multiturn pulley liquid level sensor device according to claim 1, wherein a protective device is disposed nearby the fastening rope.

9. The multiturn pulley liquid level sensor device according to claim 1, wherein the liquid level sensor device further comprises a gear speed-increasing or speed-reducing device, for making a number of turns of rotation of the magnetic encoder device matched with a number of turns of actual rotation of the rotating wheels.

10. The multiturn pulley liquid level sensor device according to claim 9 where said gear-up or gear-down device is a step-down coupling friction wheel that comprises a hub and an axle, a rotation axis of said coupling friction wheel is different from a rotation axis of said pulley and said wheel.

11. The multiturn pulley liquid level sensor device according to claim 1, wherein the external detection circuit has a wired and/or wireless data communication and interconnection function.

12. The multiturn pulley liquid level sensor device according to claim 1, wherein a relation between a liquid level height and a total number of turns of rotation of the rotating wheel is: $N=(L-L_{empty})/(\pi*D*RF)$, wherein N is the total number of turns of rotation of the rotating wheel, L is a measured liquid level height, $L_{empty}$ is a liquid level height in a case of an empty tank, D is an outer diameter of top pulley, and RF is a reduction factor.

* * * * *